R. W. BURNETT.
CONVERTIBLE GRAIN DOOR AND FLOOR SECTION FOR CARS.
APPLICATION FILED JULY 18, 1912.
1,179,277.
Patented Apr. 11, 1916.
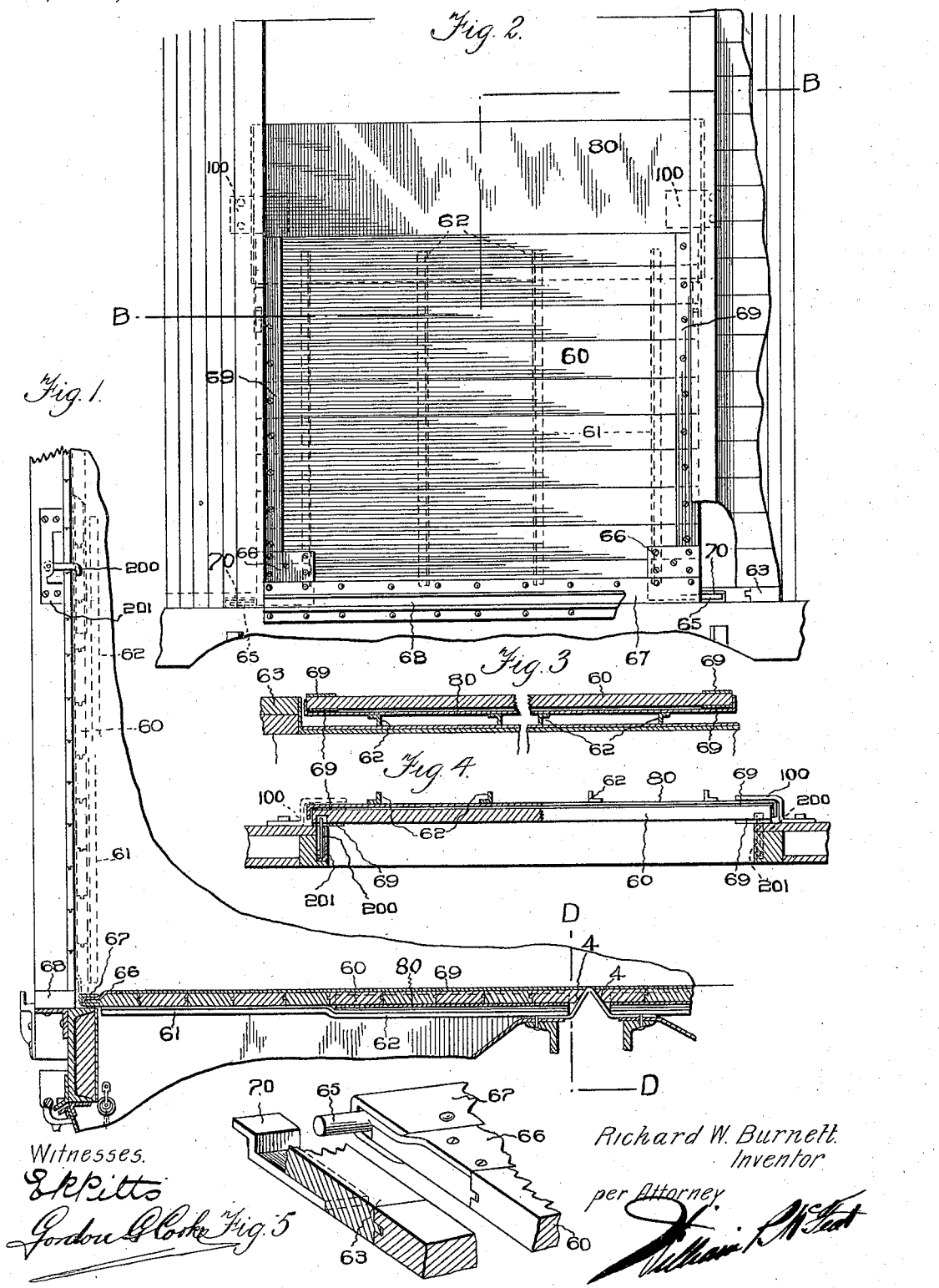

UNITED STATES PATENT OFFICE.

RICHARD WEBB BURNETT, OF MONTREAL, QUEBEC, CANADA.

CONVERTIBLE GRAIN-DOOR AND FLOOR SECTION FOR CARS.

1,179,277.  Specification of Letters Patent.  Patented Apr. 11, 1916.

Application filed July 18, 1912. Serial No. 710,266.

*To all whom it may concern:*

Be it known that I, RICHARD WEBB BURNETT, a citizen of the United States, residing at the city of Montreal, Province of Quebec, Dominion of Canada, have invented certain new and useful Improvements in Convertible Grain-Door and Floor Sections for Cars; and I do hereby declare that the following is a full, clear, and exact description thereof.

My invention relates particularly to cars for carrying loose commodities such as grain, coal, gravel, and the like, and it has for its object to simplify the construction of the car as a carrier for loose commodities, to simplify and form as a component part of the car as a general freight carrier, the grain door, and at the same time maintain in the latter the quality of adjustability in height to meet the usual requirements.

The invention may be said to consist of the construction, combination and particular arrangement of parts hereinafter described and pointed out in the claims.

For full comprehension, however, of my invention reference must be had to the accompanying drawings forming a part of this specification in which similar reference characters indicate the same parts, and wherein:

Figure 1 is a transverse sectional view of a portion of a car having my invention applied thereto as a floor member; Fig. 2 is a side elevation of a portion of a car having my invention applied thereto as a grain door; Fig. 3 is a longitudinal sectional view of my invention in position as a floor member, the view being taken on line D D Fig. 1; Fig. 4 is a horizontal sectional view taken on line B B Fig. 2; and Fig. 5 is a detail perspective view of a portion of my invention and a portion of the fixed floor with which it is in hinged relation.

A serious defect in cars of this type has been the misfit of the floor members and the unavailability of the grain-doors when required. I overcome these defects by providing a displaceable telescopic floor member adapted to displace any grain and the like left on the center sill or other members of the under-frame on which these displaceable floor members rest. The specific device for the purpose comprises a member 60 made up of tongue-and-groove boards arranged longitudinally with relation to the car and fastened together by metal bands 69 on opposite sides of this door member and braced by a series of angle-irons 61 half of the length of each of which is riveted in place and the remainder sprung out slightly as at 62 to accommodate the extensible member to be presently further alluded to. This floor member is hinged to the fixed floor members 63 of the car by means of trunnions 65 fastened to the door by plates 66 to which they are welded, such plates being riveted or bolted in place, and the whole reinforced by a plate 67 of half D-form cross-section extending throughout the hinged edge of the floor member with its angle disposed so as to bear on the top of the side sill and against a threshold strip 68 when the member 60 is raised and thus act as a grain seal, and, at the same time, serving as a stop limiting the outward movement thereof and taking up some of the strain which would otherwise be carried entirely by the door frame. The trunnions are journaled in sockets beneath the contiguous edges of the fixed floor members in which are mounted offset plates 70 confining the trunnions between them, the side of the car-body and the top of the side sill. The fixed floor members are securely fastened in place by being bolted or riveted to the underframing. The free edges of these members 60 are beveled to coincide and make contact with the diagonal jambs 4, 4. These diagonal door jambs are formed by a metal plate of inverted V cross-section the flanges whereof are riveted to the center sill. To impart to this displaceable floor member 60 all the properties of a grain-door and therefore enable it to afford a large or small loading opening as required, it is provided with the extensible member before mentioned which is indicated at 80 and of trough form slidably clasping the member 60 between it and the sprung portions of the angle-iron stiffeners. This extensible member is for use solely as a door part and is telescoped within the limits of the main door member 60 when the latter serves as a floor member.

Guiding brackets 100 secured to the car-side afford means for retaining the extended grain-door in perpendicular position, and they are so located that the extensible member 80 must be pushed fully back before the member 60 can be lowered, thus securing a proper location of the latter on the main door when it is dropped and obtaining a proper fit as part of the floor.

With the parts assembled as above described an effective and strong floor is provided for the car as a common freight carrier, and an effective grain seal for a car carrying grain, etc., being durable, light in weight, and always available. The discharge hoppers and doors are grain tight at all points and also durable and light in weight, and the complete structure is of sufficient strength to sustain the stresses exerted by the heaviest cargoes of loose commodities.

The main member 60 of the combined floor and grain-door is held in vertical position independently of the extensible section 80 and bracket by a pair of latches 200 carried by plates 201 countersunk in the sides of the door posts. The telescopic member may be held up by any preferred means.

What I claim is as follows:—

1. In a convertible car the combination with an underframe, of a combined floor member and grain door having upon the side thereof which is lowermost when down, a series of ribs cutting through lading which happens to rest upon the horizontal surfaces beneath the said combined floor member and grain door and an extensible member, said ribs being offset to accommodate said extensible member.

2. In a car, a combined grain-door and floor member consisting of a main member and an extensible member clasping said main member and in telescopic relation therewith, said combined extensible member being extended when in position as a grain-door and telescoped when in position as a floor member.

3. In a convertible car, a combined floor member and grain door consisting of a hinged main member carrying an extensible part and a series of stiffening members fastened to the main door member and guiding the extensible member.

4. In a convertible car, a combined floor member and grain door consisting of a hinged main member carrying an extensible part and a series of sprung angle-irons fastened to the main door member and guiding the extensible member.

5. In a convertible car, a combined floor member and grain door consisting of a main member hinged contiguous to the door frame and carrying an extensible part of trough form and a series of stiffening members fastened to the main door member and guiding the extensible member.

6. In a convertible car, a combined floor member and grain door consisting of a hinged main member carrying an extensible part of trough form in telescopic relation therewith and a series of sprung angle-irons fastened to the main door member and guiding the extensible member.

In testimony whereof I have signed my name to this specification in the presence of two witnesses.

RICHARD WEBB BURNETT.

Witnesses:
M. E. COONS,
P. JOHN MOYNAUGH.

Copies of this patent may be obtained for five cents each, by addressing the "Commissioner of Patents, Washington, D. C."